US011413904B2

(12) United States Patent
Martin et al.

(10) Patent No.: US 11,413,904 B2
(45) Date of Patent: Aug. 16, 2022

(54) AXLE ASSEMBLY HAVING A FLUID PASSAGE AND METHOD OF MANUFACTURE

(71) Applicant: ArvinMeritor Technology, LLC, Troy, MI (US)

(72) Inventors: Robert Martin, Harrison Township, MI (US); Brian Hayes, Newark, OH (US)

(73) Assignee: Arvin Meritor Technology, LLC, Troy, MI (US)

( * ) Notice: Subject to any disclaimer, the term of this patent is extended or adjusted under 35 U.S.C. 154(b) by 281 days.

(21) Appl. No.: 16/779,224

(22) Filed: Jan. 31, 2020

(65) Prior Publication Data

US 2021/0237508 A1 Aug. 5, 2021

(51) Int. Cl.
*B60B 35/16* (2006.01)
*B23K 20/12* (2006.01)
*B60B 35/14* (2006.01)
*B23K 101/04* (2006.01)

(52) U.S. Cl.
CPC .......... *B60B 35/163* (2013.01); *B23K 20/129* (2013.01); *B60B 35/14* (2013.01); *B23K 2101/04* (2018.08); *B60B 2310/3025* (2013.01); *B60B 2310/316* (2013.01); *B60B 2900/5116* (2013.01)

(58) Field of Classification Search
CPC ........... B60B 2900/5116; B60B 35/163; B60B 35/14
See application file for complete search history.

(56) References Cited

U.S. PATENT DOCUMENTS

| 4,582,107 A * | 4/1986 | Scully ............... B60C 23/00363 |
| | | 152/417 |
| 8,794,280 B2 | 8/2014 | Flory et al. |
| 9,126,460 B2 * | 9/2015 | Knapke ............ B60C 23/00345 |
| 9,278,587 B2 | 3/2016 | Honig |
| 9,283,818 B2 | 3/2016 | Keeney et al. |
| 9,315,077 B2 | 4/2016 | Flory et al. |
| 9,333,813 B2 | 5/2016 | Tiziani et al. |
| 9,428,016 B2 | 8/2016 | Keeney et al. |
| 9,452,644 B2 | 9/2016 | Keeney et al. |
| 9,452,645 B2 | 9/2016 | Polubinski et al. |
| 9,481,213 B2 | 11/2016 | Keeney et al. |
| 9,517,663 B2 | 12/2016 | Lewandowski et al. |
| 9,539,865 B2 | 1/2017 | Lakin et al. |
| 9,597,931 B2 | 3/2017 | Dean et al. |
| 9,713,854 B2 | 7/2017 | Zhai et al. |
| 9,809,065 B2 | 11/2017 | Polubinski et al. |
| 9,815,340 B2 | 11/2017 | Trostle et al. |
| 9,919,569 B2 | 3/2018 | Lewandowski et al. |
| 10,035,384 B2 | 7/2018 | Keeney et al. |
| 10,052,923 B2 | 8/2018 | Power et al. |

(Continued)

OTHER PUBLICATIONS

Ghatti, et al., U.S. Appl. No. 16/594,795, filed with the United States Patent and Trademark Office on Oct. 7, 2019.

*Primary Examiner* — Scott A Browne
(74) *Attorney, Agent, or Firm* — Brooks Kushman PC (57) ABSTRACT

An axle assembly and method of manufacture. The axle assembly may include a sleeve that is disposed in a spindle and that is in sealing engagement with the spindle proximate opposing ends. The sleeve has a smaller diameter than the spindle such that a fluid passage is provided between the spindle and the sleeve.

20 Claims, 9 Drawing Sheets

(56) References Cited

U.S. PATENT DOCUMENTS

| | | |
|---|---|---|
| 10,391,824 B2 | 8/2019 | Trostle et al. |
| 2014/0041481 A1 | 2/2014 | Pinotti |
| 2015/0096655 A1 | 4/2015 | Koulinitch et al. |
| 2018/0209496 A1* | 7/2018 | Hester .................... B60B 35/08 |
| 2019/0039409 A1 | 2/2019 | Eschenburg et al. |
| 2019/0331173 A1 | 10/2019 | Eschenburg et al. |

* cited by examiner

AXLE ASSEMBLY HAVING A FLUID PASSAGE AND METHOD OF MANUFACTURE

TECHNICAL FIELD

This disclosure relates to an axle assembly that has a housing assembly that has a fluid passage and a method of manufacture.

BACKGROUND

An axle assembly having an axle housing is disclosed in U.S. patent application Ser. No. 16/594,795.

SUMMARY

In at least one embodiment, an axle assembly is provided. The axle assembly may include a spindle and a sleeve. The spindle may have a spindle hole that may extend along an axis from a first end of the spindle to a second end of the spindle. The sleeve may be disposed in the spindle hole and may have a first sleeve end and a second sleeve end that are in sealing engagement with the spindle. At least a portion of the sleeve may be smaller than the spindle between the first sleeve end and the second sleeve end such that a fluid passage is provided between the spindle and the sleeve.

In at least one embodiment, an axle assembly is provided. The axle assembly may include a spindle, a sleeve, a first weld, and a second weld. The spindle may have a spindle hole that may extend along an axis from a first end of the spindle to a second end of the spindle. The sleeve may be disposed in the spindle hole. The sleeve may have a first sleeve end and a second sleeve end. The first weld may extend around the axis and may join the first end and the first sleeve end. The second weld may extend around the axis and may join the second end to the second sleeve end. The sleeve may have a smaller diameter than the spindle between the first sleeve end and the second sleeve end such that a fluid passage is provided between the spindle and the sleeve.

In at least one embodiment, a method of making an axle assembly is provided. The method may include providing a spindle that may have a spindle hole that extends along an axis from a first end of the spindle to a second end of the spindle. A sleeve may be provided that has a first sleeve end and a second sleeve end. The sleeve may be inserted into the spindle hole such that there is a gap between the spindle and the sleeve between the first sleeve end and the second sleeve end. First and second air impermeable connections may be provided between the spindle and the sleeve proximate the first and second sleeve ends, respectively.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
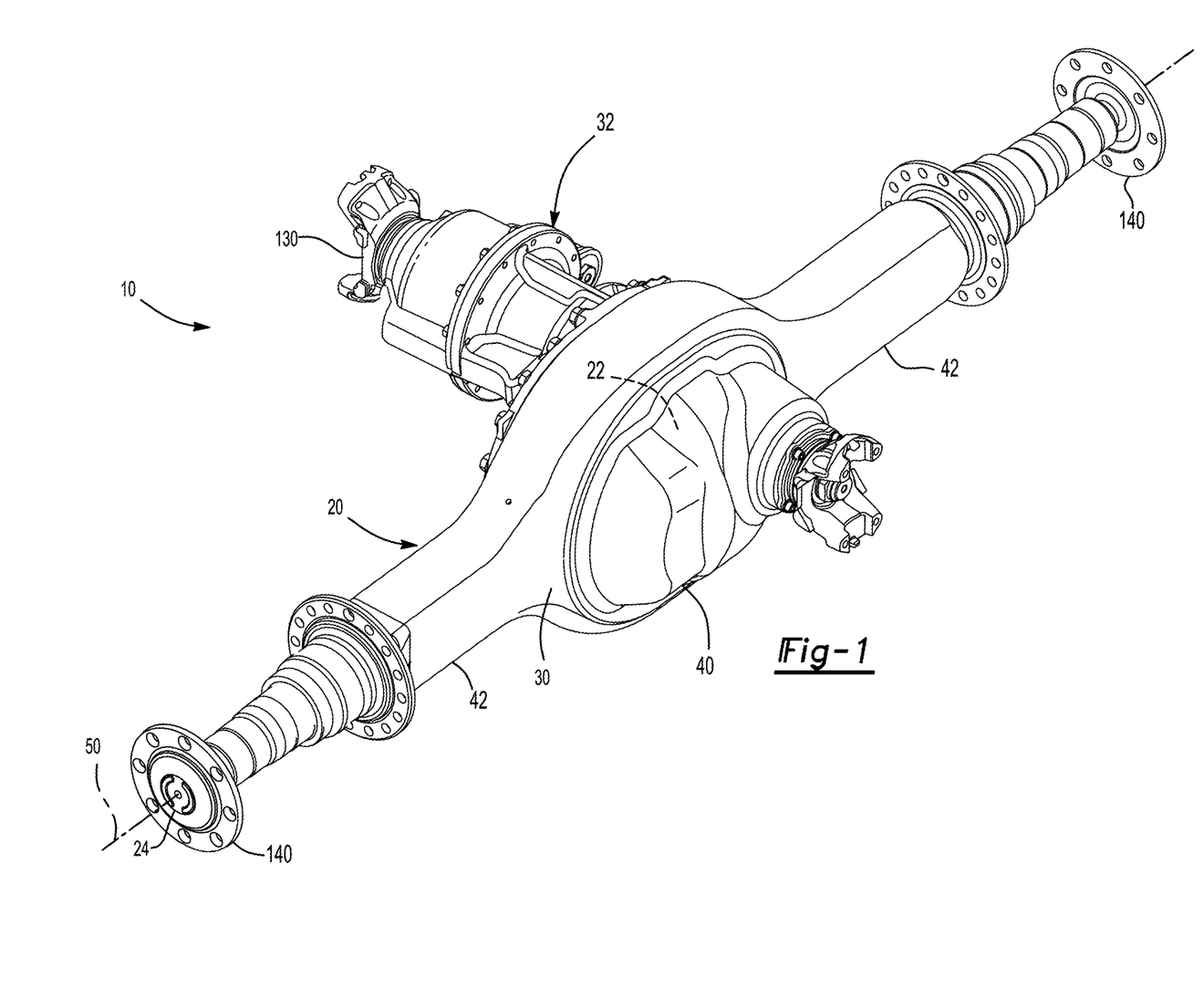
FIG. 1 is a perspective view of an example of an axle assembly.

Referring to FIG. 1, an example of an axle assembly 10 is shown. The axle assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies may be provided with the vehicle. For example, the axle assembly 10 may be part of a tandem axle configuration or multi-axle configuration that may include a plurality of axle assemblies that may be connected in series. The axle assembly 10 may include a housing assembly 20, a differential assembly 22, and at least one axle shaft 24.

Figure 2:
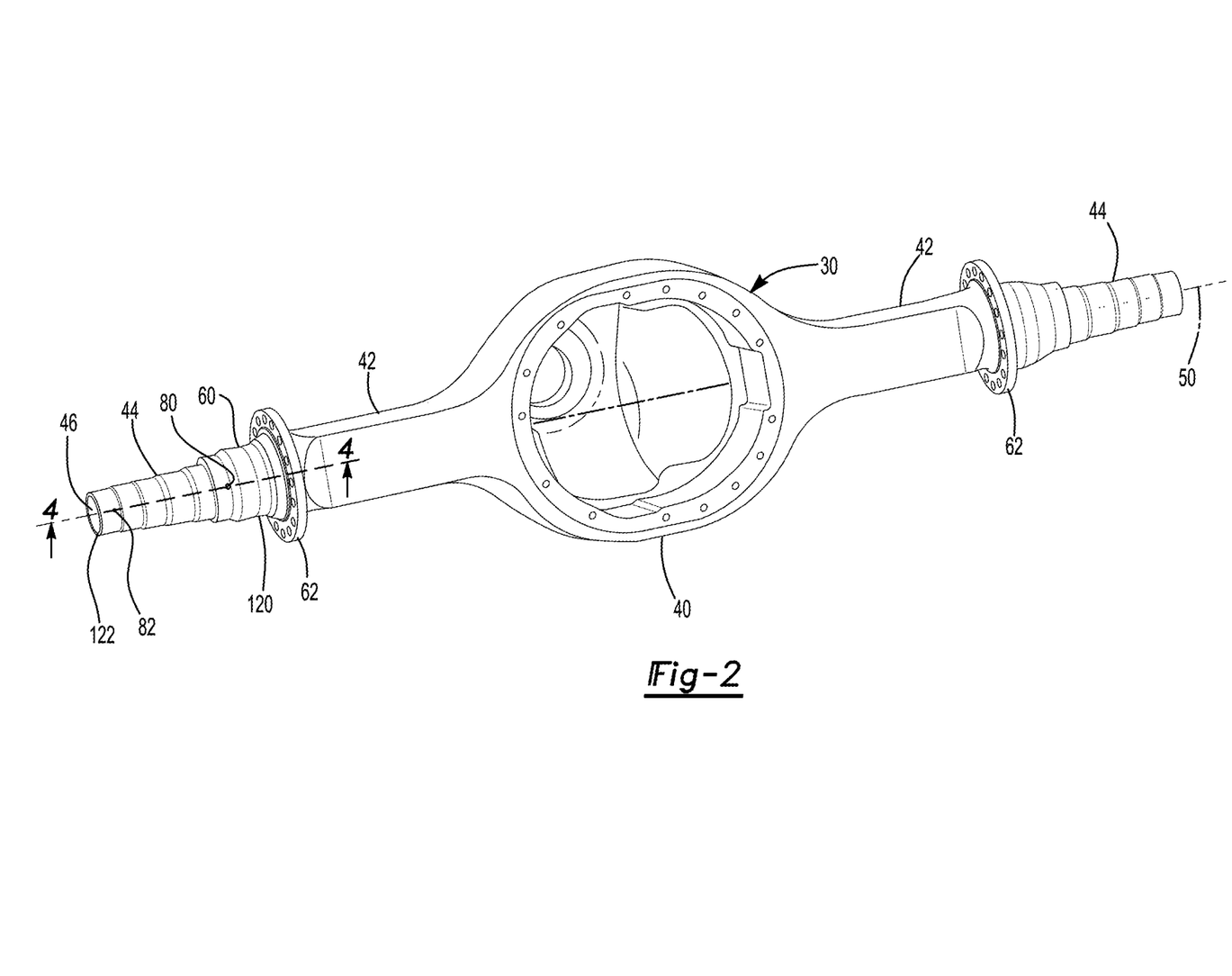
FIG. 2 is a perspective view of an example of an axle housing that may be provided with the axle assembly.

Referring to FIGS. 1 and 2, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axle shafts 24. In at least one embodiment, the axle housing 30 may include a center portion 40 and at least one arm portion 42. A spindle 44 and a sleeve 46 may also be provided with the axle housing 30 and may extend from or may be provided with at least one arm portion 42.

The center portion 40 may be disposed proximate the center of the axle housing 30. The center portion 40 may define an opening and a cavity that may receive the differential assembly 22. For example, the differential carrier 32 may be mounted to the center portion 40 such that a portion of the differential carrier 32 may extend through the opening in the center portion 40 and the differential assembly 22 may be received inside the center portion 40. A lower region of the center portion 40 may at least partially define a sump portion that may contain lubricant. Splashed lubricant may flow down the sides of the center portion 40 and may flow over internal components of the axle assembly 10 and gather in the sump portion.

One or more arm portions 42 may extend from the center portion 40. For example, two arm portions 42 may extend in opposite directions from the center portion 40 and away from the differential assembly 22. An arm portion 42 may be adapted to receive an axle shaft 24. For example, an arm portion 42 may have a hollow configuration or tubular configuration that may extend around a corresponding axle shaft 24 and may help separate or isolate the axle shaft 24 from the surrounding environment. The arm portion 42 may also extend around an axis 50. The axle shaft 24 and/or a vehicle wheel may be rotatable about the axis 50. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners.

An arm portion 42 may include an arm portion end surface 60. The arm portion end surface 60 may be disposed at a distal end of the arm portion 42 that may face away from and may be disposed opposite the center portion 40. In at least one configuration, the arm portion end surface 60 may be disposed substantially perpendicular to the axis 50.

A brake mounting flange 62 may be provided with the arm portion 42 to facilitate mounting of a brake assembly. The brake mounting flange 62 may be axially positioned or positioned along the axis 50 between the center portion 40 and the arm portion end surface 60.

Figure 3:
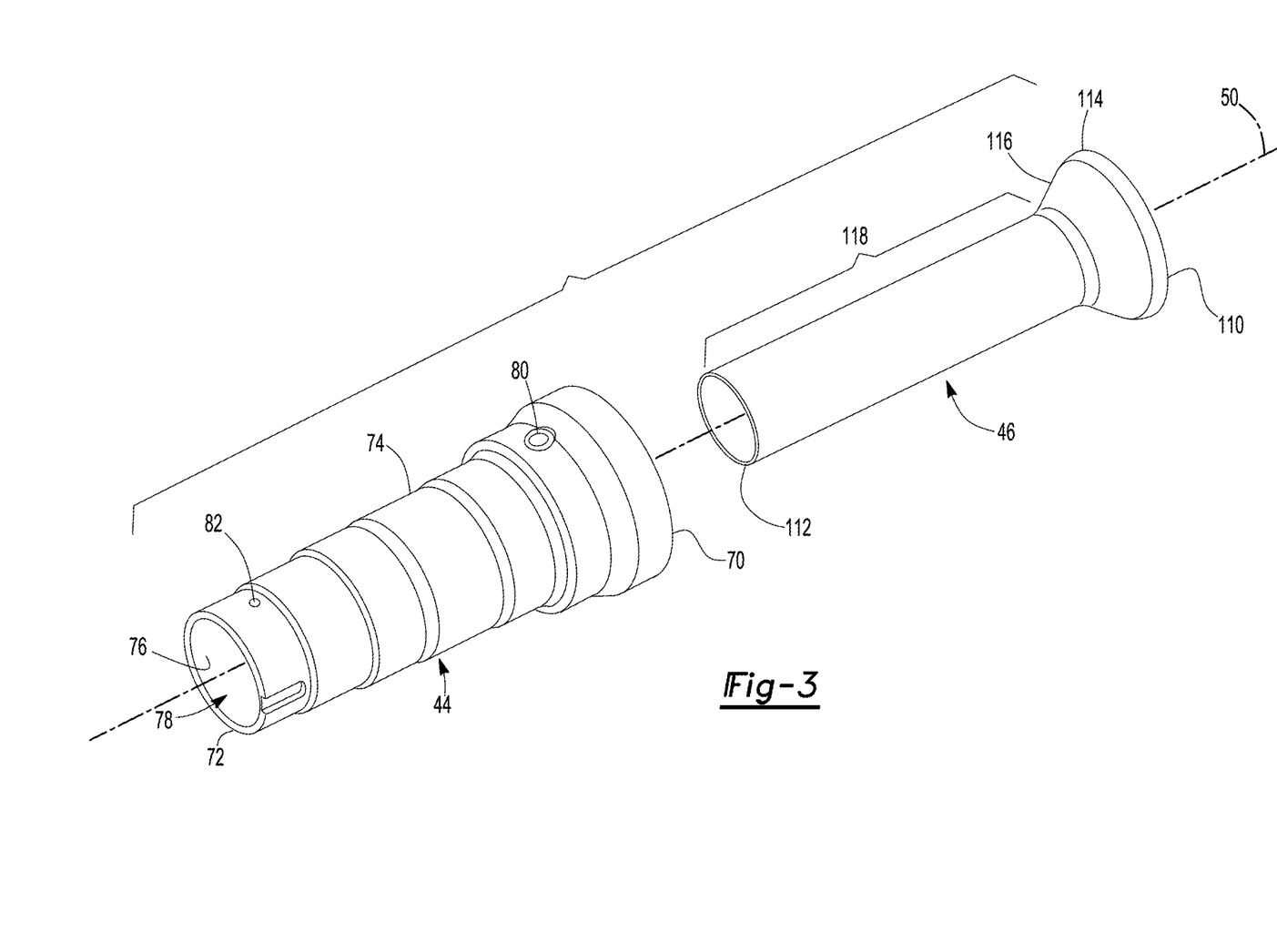
FIG. 3 is an exploded view of a portion of the axle housing that illustrates examples of a spindle and a sleeve.
Figure 4:
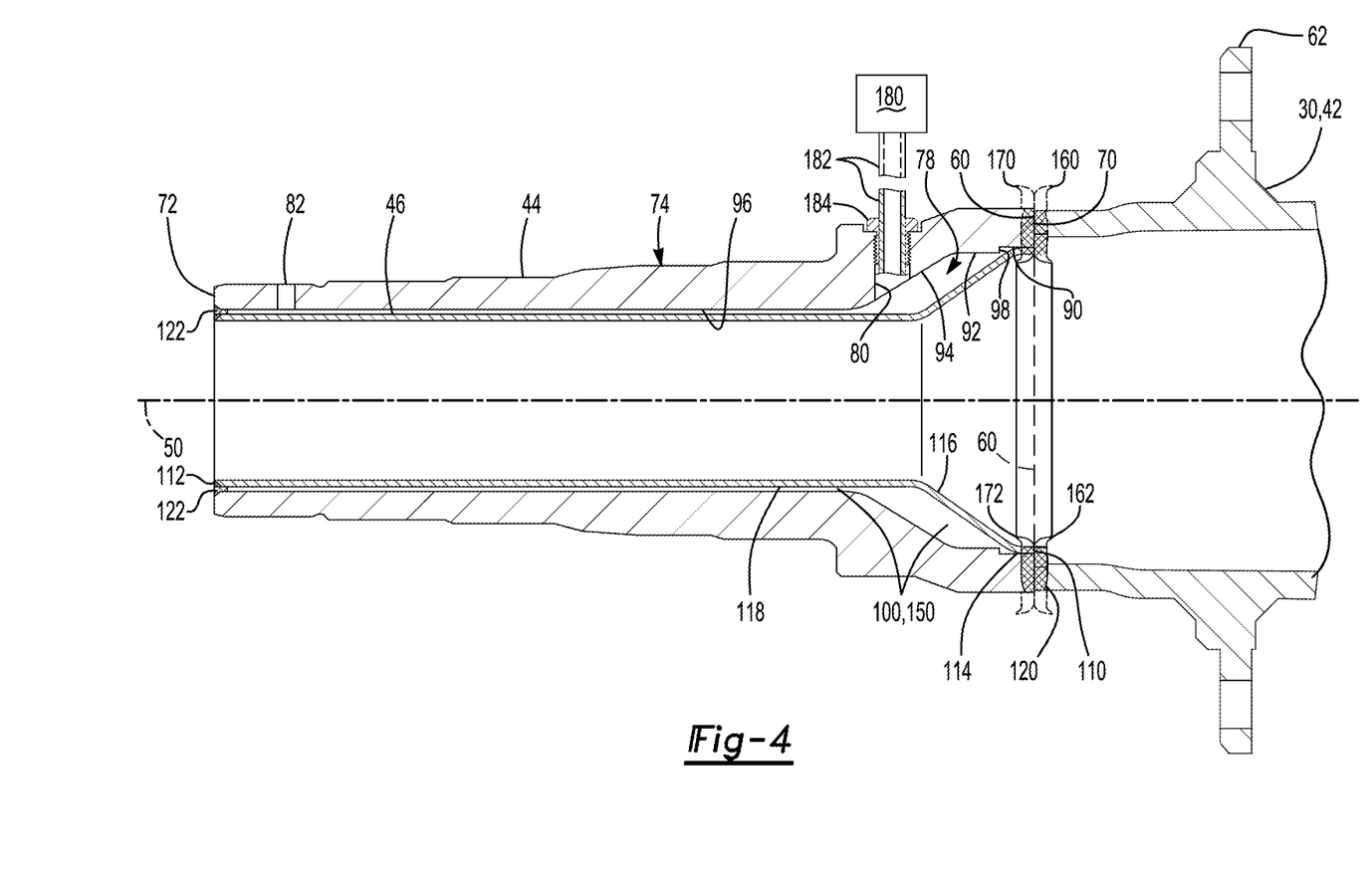
FIG. 4 is a section view of a portion of the axle housing along section line 4-4 with the axle shaft omitted for clarity.

Referring to FIGS. 2-4, the spindle 44 may extend along or around the axis 50. The spindle 44 may be configured to support a wheel hub of a wheel end assembly. For instance, the spindle 44 may be received inside one or more wheel bearings that may rotatably support the wheel hub. The wheel hub may facilitate mounting of a wheel upon which a tire may be disposed. The spindle 44 may be provided with an axle assembly having a steerable or a non-steerable configuration. In a steerable configuration, the spindle 44 may be provided with and may be fixedly positioned with respect to a supporting structural component that may be referred to as a steering knuckle. In a non-steerable configuration, the spindle 44 may extend from and may be fixedly positioned with respect to an arm portion 42 of the axle housing 30. For convenience in reference, the term axle housing may be used to generically refer to a supporting structural component that may be a steering knuckle or an axle housing having an arm portion 42. The spindle 44 will be primarily described below with respect to a non-steerable configuration. In a steerable configuration or a non-steerable configuration, the spindle 44 may include a first end 70, a second end 72, an exterior side 74, an interior side 76, a spindle hole 78, a first port 80, and optionally a second port 82. These features are best shown with reference to FIGS. 3 and 4.

The first end 70, which may also be referred to as a first end surface, may be disposed proximate a supporting structural component, such as the axle housing 30. For example, the first end 70 may face toward and may contact or engage the arm portion end surface 60 of an arm portion 42 of the axle housing 30. In at least one configuration, the first end 70 may be disposed substantially parallel to the arm portion end surface 60 and may be disposed substantially perpendicular to the axis 50.

The second end 72 may be disposed opposite the first end 70. As such, the second end 72 may face away from the supporting structural component, such as the arm portion 42 of the axle housing 30. The second end 72 may be a distal end surface of the axle housing 30.

The exterior side 74 may face away from the axis 50. The exterior side 74 may extend from the first end 70 to the second end 72 and may include one or more exterior surfaces that may be disposed at various distances from the axis 50. One or more wheel bearings may engage or contact the exterior side 74.

The interior side 76 may be disposed opposite the exterior side 74. As such, the interior side 76 may face toward the axis 50. The interior side 76 may extend from the first end 70 to the second end 72 and may include a plurality of interior surfaces. For instance, the interior side 76 may include a first inner surface 90, a second inner surface 92, a third inner surface 94, a fourth inner surface 96, and a step surface 98, which are best shown in FIG. 4.

The first inner surface 90 may extend from the first end 70. The first inner surface 90 may face toward the axis 50. In at least one configuration, the first inner surface 90 may extend continuously around the axis 50 and may have a first diameter.

The second inner surface 92 may be axially positioned between the first inner surface 90 and the third inner surface 94. The second inner surface 92 may face toward the axis 50 and may be spaced apart from the first inner surface 90. The second inner surface 92 may extend continuously around the axis 50 and may have a second diameter that may be smaller than the first diameter.

The third inner surface 94 may extend between the second inner surface 92 and the fourth inner surface 96. In at least one configuration, the third inner surface 94 may extend from an end of the second inner surface 92 that may be disposed opposite the step surface 98 to an end of the fourth inner surface 96. The third inner surface 94 may face toward the axis 50, may extend around the axis 50, and may not have a constant diameter. For instance, the third inner surface 94 may have a tapered configuration in which the diameter of the third inner surface 94 becomes progressively smaller in an axial direction that extends from the first end 70 toward the second end 72.

The fourth inner surface 96 may extend between the third inner surface 94 and the second end 72. In at least one configuration, the fourth inner surface 96 may extend from an end of the third inner surface 94 that may be disposed opposite the second inner surface 92 to the second end 72. The fourth inner surface 96 may face toward the axis 50. In at least one configuration, the fourth inner surface 96 may extend continuously around the axis 50 and may have a diameter that may be smaller than the first diameter and the second diameter. As an example, the fourth inner surface 96 may have a diameter of 64.0 mm.

The step surface 98 may extend from the first inner surface 90 to the second inner surface 92. For instance, the step surface 98 may extend from an end of the first inner surface 90 to an end of the second inner surface 92. In at least one configuration, the step surface 98 may be disposed substantially perpendicular to the axis 50. The step surface 98 may act as a stop that may limit the distance the sleeve 46 can be inserted into the spindle hole 78. It is also contemplated that the step may be omitted in a configuration where the second inner surface 92 has the same diameter as the first inner surface 90, in which case the second inner surface 92 is effectively replaced by the first inner surface 90.

The spindle hole 78 may extend from the first end 70 to the second end 72 and may be defined by or at least partially defined by the interior side 76. The spindle hole 78 may receive the sleeve 46 and may cooperate with the sleeve 46 to at least partially define a fluid passage 100 as will be discussed in more detail below.

The first port 80 may provide a connection to the fluid passage 100. The first port 80 may be disposed in the spindle 44. For instance, the first port 80 may extend from the exterior side 74 to the interior side 76 of the spindle 44 and thus may extend to the fluid passage 100. The first port 80 may be axially positioned closer to the first end 70 than the second port 82. For example, the first port 80 may be axially positioned such that the first port 80 may extend from the exterior side 74 to the third inner surface 94 of the interior side 76. The first port 80 may be disposed substantially perpendicular to the axis 50 and one or more embodiments.

The second port 82 may also provide a connection to the fluid passage 100. The second port 82 may be spaced apart from the first port 80. For instance, the second port 82 may be axially positioned closer to the second end 72 than the first end 70 and may be axially positioned closer to the second end 72 than the first port 80. In the configuration shown in FIG. 4, the second port 82 is disposed in the spindle 44 and may extend from the exterior side 74 to the interior side 76. For instance, the second port 82 may extend from the exterior side 74 to the fourth inner surface 96, and thus may extend of the fluid passage 100. The second port 82 may be spaced apart from the second end 72 and may be disposed substantially perpendicular to the axis 50 in such a configuration. In the configuration shown in FIG. 5, the second port 82 is disposed proximate the second end 72 of the spindle 44 and may be provided in or may extend through a second weld 122 that may couple or join the sleeve 46 to the spindle 44 as will be discussed in more detail below.

Referring to FIGS. 3 and 4, the sleeve 46 may be disposed in the spindle hole 78 and may cooperate with the spindle 44 to at least partially define the fluid passage 100. The sleeve 46 may be fixedly positioned with respect to the spindle 44 and at least a portion of the sleeve 46 may be spaced apart from the spindle 44. In at least one configuration, the sleeve 46 may include a first sleeve end 110, a second sleeve end 112. The sleeve 46 may also include one or more of a mounting flange 114, a connecting portion 116, and a tubular body 118. The sleeve 46 and the spindle 44 may or may not have substantially the same axial length.

The first sleeve end 110, which may also be referred to as a first sleeve end surface, may be disposed proximate or adjacent to the first end 70 of the spindle 44. The first sleeve end 110 may face toward the axle housing 30. In at least one configuration, the first sleeve end 110 may be substantially aligned with the first end 70 of the spindle 44. The first sleeve end 110 may be spaced apart from the axle housing 30 and may not be attached to the axle housing 30 prior to joining or welding as will be discussed in more detail below.

The second sleeve end 112 may be disposed opposite the first sleeve end 110. As such, the second sleeve end 112 may face away from the supporting structural component, such as a steering knuckle or arm portion 42 of the axle housing 30. The second sleeve end 112 may be disposed proximate the second end 72 of the spindle 44. The second sleeve end 112 may be detached from the spindle 44 and may be spaced apart from the spindle 44 prior to joining the sleeve 46 to the spindle 44 as will be discussed in more detail below.

The mounting flange 114 may extend from the first sleeve end 110. In at least one configuration, the mounting flange 114 may engage or contact the interior side 76 of the spindle 44. For instance, the mounting flange 114 may have an exterior surface that may face away from the axis 50 and that may engage or contact the first inner surface 90 of the spindle 44. In at least one configuration, the mounting flange 114 may extend continuously around the axis 50 and may have an outside diameter that may be larger than an outside diameter of the connecting portion 116. The mounting flange 114 may be spaced apart from the second inner surface 92 of the spindle 44 and optionally may be spaced apart from the step surface 98 of the spindle 44.

The connecting portion 116 may extend between the mounting flange 114 and the tubular body 118. In at least one configuration, the connecting portion 116 may extend from an end of the mounting flange 114 that may be disposed opposite the first sleeve end 110 to an end of the tubular body 118. The connecting portion 116 may be spaced apart from the spindle 44. In addition, the connecting portion 116 may not have a constant diameter. For instance, the connecting portion 116 may have a tapered configuration in which the diameter of the connecting portion 116 becomes progressively smaller in an axial direction that extends from the mounting flange 114 toward the tubular body 118. Thus, mounting flange 114 may have a larger diameter or larger outside diameter than the connecting portion 116. In at least one configuration, the connecting portion 116 may be received inside the portion of the spindle hole 78 defined by the second inner surface 92, the third inner surface 94, or combinations thereof.

The tubular body 118 may extend between the connecting portion 116 and the second sleeve end 112. For example, the tubular body 118 may extend from an end of the connecting portion 116 to the second sleeve end 112. The tubular body 118 may be spaced apart from the spindle 44. For instance, the tubular body 118 may have an exterior surface that may face away from the axis 50 and that may be spaced apart from the interior side 76 of the spindle 44. In at least one configuration, the tubular body 118 may extend continuously around the axis 50 and may have an outside diameter that may be smaller than the outside diameter of the mounting flange 114 and the connecting portion 116. As an example, the tubular body 118 may have an outside diameter of 60.0 mm. The tubular body 118 may be received inside the portion of the spindle hole 78 defined by the third inner surface 94, the fourth inner surface 96, or combinations thereof.

Figure 5:
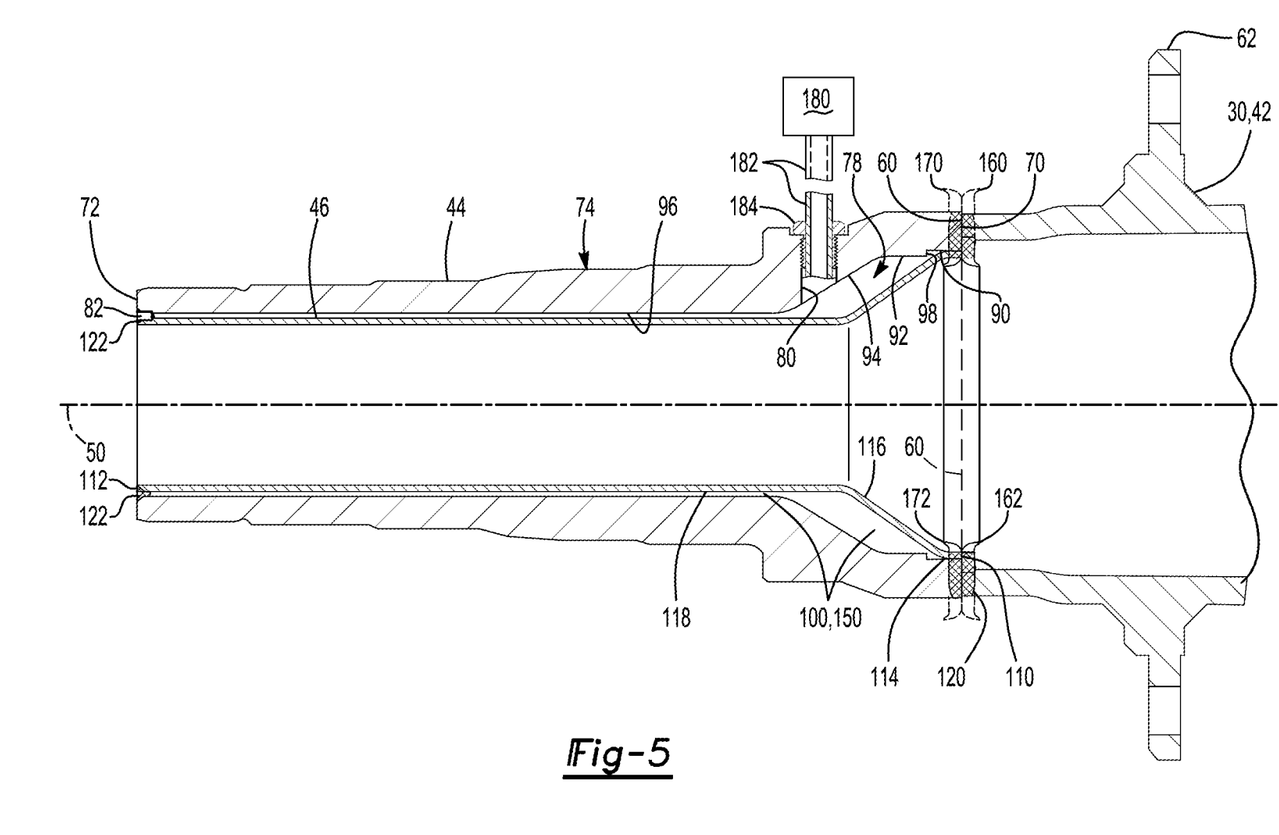
FIG. 5 is a section view of another configuration of the portion of the axle housing.

Referring primarily to FIGS. 4 and 5, the sleeve 46 may be joined to the spindle 44 in any suitable manner. In at least one configuration, the sleeve 46 may be joined the spindle 44 with a first weld 120 and a second weld 122.

The first weld 120 may join the arm portion 42, the spindle 44, and the sleeve 46. The first weld 120 may be provided at the first end 70 of the spindle 44. In at least one configuration, the first weld 120 may extend continuously around the axis 50 and may join the first end 70 of the spindle 44 to the first sleeve end 110 of the sleeve 46.

The second weld 122 may join the spindle 44 and the sleeve 46. The second weld 122 may be provided at the second end 72 of the spindle 44. In at least one configuration, the second weld 122 may extend continuously around the axis 50 and may join the second end 72 of the spindle 44 to the second sleeve end 112 of the sleeve 46. For instance, the configurations shown in FIGS. 4 and 5 may employ a continuous weld. In the configuration shown in FIG. 5, material may be removed from the second weld 122 to form the second port 82. Alternatively, the second weld 122 may join the second end 72 of the spindle 44 to the second sleeve end 112 but may not extend continuously around the axis 50. Instead, the second weld 122 may be discontinuous and the second port 82 or a fitting that defines the second port 82 may be positioned opposing distal ends of the second weld 122 in a configuration like that shown in FIG. 5.

Referring primarily to FIGS. 4 and 5, the fluid passage 100 may be located inside the spindle 44 between the spindle 44 and the sleeve 46. For example, the fluid passage 100 may be provided where the outer side of sleeve 46 that faces away from the axis 50 is spaced apart from disposed closer to the axis 50 than the interior side 76 of the spindle 44. In at least one configuration, the fluid passage 100 may be provided where the outer side of the sleeve 46 has a smaller diameter and is spaced apart from the interior side 76 of the spindle 44. The fluid passage 100 may extend in a radial direction between the interior side 76 of the spindle 44 and the sleeve 46. The fluid passage 100 may be axially positioned between the first sleeve end 110 and the second sleeve end 112. For instance, the fluid passage 100 may extend in an axial direction between the first weld 120 and the second weld 122. As another example, the fluid passage 100 may extend in an axial direction from where the mounting flange 114 of the sleeve 46 engages or contacts the first inner surface 90 of the spindle 44 to the second weld 122. Thus, the spindle 44 may be spaced apart from the sleeve 46 between the mounting flange 114 of the sleeve 46 and the second weld 122. The fluid passage 100 may be larger between the connecting portion 116 of the sleeve 46 and the spindle 44 than between the tubular body 118 and the spindle 44. For instance, the connecting portion 116 may be disposed further from the third inner surface 94 of the spindle 44 than the tubular body 118 is disposed from the fourth inner surface 96 of the spindle 44.

Referring to FIG. 1, the differential carrier 32, which may also be called a carrier housing, may be mounted on the center portion 40 of the axle housing 30. The differential carrier 32 may support the differential assembly 22. For instance, the differential carrier 32 may include one or more bearing supports that may facilitate mounting of a roller bearing assembly that may rotatably support the differential assembly 22. The differential carrier 32 may be configured as a single component or as multiple components that are assembled to each other. In at least one configuration, the differential carrier 32 may be mounted to the center portion 40 of the axle housing 30 with fasteners such as bolts.

Referring to FIG. 1, the differential assembly 22 may be disposed in the center portion 40 of the housing assembly 20. The differential assembly 22 may transmit torque from a power source, such as an engine or an electric motor, to the vehicle traction wheels and permit the traction wheels to rotate at different velocities. An abbreviated discussion of the operation of the differential assembly 22 follows with reference to FIG. 1, beginning with the input yoke 130 shown in FIG. 1. However, it is to be understood that the input yoke 130 may be omitted and that the power source may be operatively connected to the drive pinion without an input yoke.

The input yoke 130 may be coupled to a vehicle drivetrain component, such as a drive shaft, that may be coupled to an output of a vehicle transmission or transfer case, which in turn may receive torque from the vehicle power source. Alternatively, the input yoke 130 may be operatively connected to an output of another axle assembly. The input yoke 130 may be operatively connected to a drive pinion. The drive pinion may provide torque to a ring gear of the differential assembly 22 and may rotate the differential assembly 22 about the axis 50. The differential assembly 22 may be operatively connected to the axle shafts 24 and may permit the axle shafts 24 to rotate at different rotational speeds in a manner known by those skilled in the art. As such, the differential assembly 22 may receive torque via the ring gear and provide torque to the axle shafts 24.

An axle shaft 24 may transmit torque from the differential assembly 22 to a corresponding traction wheel. For example, two axle shafts 24 may be provided such that each axle shaft 24 extends through a different arm portion 42 of axle housing 30. In at least one configuration, the axle shafts 24 may extend along and may be rotated about the axis 50 by the differential assembly 22. Each axle shaft 24 may have a first end and a second end. The first end may be operatively connected to the differential assembly 22. The second end may be disposed opposite the first end and may be operatively connected to a wheel hub. As one nonlimiting example, the axle shaft 24 may include an axle flange 140 that may be disposed proximate the second end of the axle shaft 24 and may facilitate coupling of the axle shaft 24 to the wheel hub. It is also contemplated that the axle flange 140 may be omitted and that the axle shaft 24 may be directly or indirectly connected to the wheel hub with other features, such as mating splines, an intervening gear set, or any suitable coupling or fitting as known by those skilled in the art.

An axle assembly having a spindle 44 and a sleeve 46 may be manufactured in various ways.

The spindle 44 may be initially provided with or without ports. For instance, a port, such as the first port 80, the second port 82, or both, may be provided before or after the sleeve 46 is assembled to the spindle 44. A port may be formed in the spindle 44 when the spindle 44 is made, such as by casting a port into the spindle 44. Alternatively, a port may be provided by removing material from the spindle 44, such as by drilling a hole through the spindle 44. Providing a port after joining the spindle 44 to the arm portion 42 as discussed below may simplify manufacturing in that the rotational position of the spindle 44 about the axis 50 may not need to be controlled during assembly to obtain a desired orientation of the port or ports.

The sleeve 46 may be inserted into the spindle hole 78 such that there is a gap 150 between the spindle 44 and the sleeve 46. This gap 150 may partially define the fluid passage 100 and may be used to refer to the space between the spindle 44 and the sleeve 46 prior to joining these components. In at least one configuration, the sleeve 46 may be inserted into the spindle hole 78 such that the mounting flange 114 of the sleeve 46 may contact the first inner surface 90 of the spindle 44. Moreover, the sleeve 46 and the spindle may be provided with an interference fit (e.g., press fit against the spindle 44) proximate the first end 70 when the sleeve 46 is inserted into the spindle hole 78 such that the mounting flange 114 may contact the first inner surface 90 with an interference fit. Press fitting the sleeve 46 into the spindle 44 may help hold the sleeve 46 in position during subsequent assembly steps and may help position the sleeve 46 in the spindle hole 78 such that the connecting portion 116 and the tubular body 118 of the sleeve 46 may be spaced apart from the spindle 44.

The spindle 44 may be joined to the sleeve 46 after the sleeve 46 is inserted into the spindle hole 78. For example, the sleeve 46 may be joined to the spindle 44 and to the arm portion 42 of the axle housing 30 proximate the first end 70 of the spindle 44. The spindle 44 may be joined to the sleeve 46 and to the axle housing 30 in any suitable manner that may provide an air impermeable connection between the spindle 44 and the sleeve 46. For example, the spindle 44 may be joined to the sleeve 46 and the axle housing 30 by welding the sleeve 46 to the spindle 44, such as by providing the first weld 120. In at least one configuration, the first weld 120 may be provided by friction welding the spindle 44 to the arm portion 42.

During friction welding, at least one of the spindle 44 and the arm portion 42 may be rotated about an axis, such as axis 50 and then the first end 70 of the spindle 44 may be engaged with the arm portion end surface 60 under an axial load. The friction between the first end 70 and the arm portion end surface 60 may generate heat that may partially melt the spindle 44 and the arm portion 42. Axial loading may generate curls on the spindle 44 and the arm portion 42. For example, as is best shown in FIGS. 4 and 5, a first external curl 160 and a first internal curl 162 may be primarily generated from the arm portion 42 while a second external curl 170 and a second internal curl 172 may be primarily generated from the spindle 44. The first external curl 160 and the second external curl 170 may extend away from the axis 50 and are shown in phantom in FIGS. 4 and 5 as these curls may be removed at any point after they are generated. The first internal curl 162 and the second internal curl 172 may extend toward the axis 50 and may be disposed inside the hole in the arm portion 42 and the spindle hole 78. The internal curls and the external curls may extend in a continuous ring about the axis 50 and may increase in size as friction welding continues. A hot internal curl, such as the second internal curl 172, may extend to the sleeve 46 and may weld or join to the first sleeve end 110 and optionally the mounting flange 114 of the sleeve 46. Thus, the first weld 120 may extend to the sleeve 46 and join the sleeve 46 to the spindle 44 and the arm portion 42 at the first sleeve end 110. Rotation of the spindle 44 and/or the arm portion 42 and axial loading may be terminated when the first weld 120 is complete. As such, the first weld 120 may weld the arm portion 42, spindle 44, and sleeve 46 together and may create an air impermeable welded connection between the spindle 44 and the sleeve 46 that may seal a first end of the fluid passage 100.

The sleeve 46 may also be joined to the spindle 44 proximate the second end 72 of the spindle 44. The spindle 44 may be joined to the sleeve 46 proximate the second end 72 in any suitable manner. For example, the spindle 44 may be joined to the sleeve 46 by welding, such as by providing the second weld 122 proximate the second end 72 of the spindle 44 and the second sleeve end 112 of the sleeve 46. For example, the second weld 122 may extend from the second end 72 of the spindle 44 to the second sleeve end 112 of the sleeve 46 and may create an air impermeable welded connection where the second weld 122 is provided. The second weld 122 may extend continuously around the axis 50 or may extend partially around the axis 50 as previously discussed. It is contemplated that the second weld 122 may be provided after the first weld 120 is provided, before the first weld 120 is provided, or at the same time the first weld 120 is provided.

The first port 80 and the second port 82 may be provided before or after the spindle 44 is attached to the axle housing 30 as previously discussed. For instance, the first port 80 may be provided before or after the spindle 44 is joined to the axle housing 30. The second port 82 may be provided before or after the spindle 44 is joined to the axle housing 30 in the configuration shown in FIG. 4. In the configuration shown in FIG. 5, the second port 82 may be provided between opposing distal ends of the second weld 122 or by removing material from the second weld 122 as previously discussed. In a configuration where material is removed, the second port 82 may be formed by removing material from the second weld 122 and optionally the spindle 44, the sleeve 46, or both. Material may be removed in any suitable manner, such as by drilling a hole through at least the second weld 122 to the fluid passage 100.

Referring to FIGS. 4 and 5, the first port 80, the second port 82, and the fluid passage 100 may help convey a fluid between a pressurized fluid source 180 and a component that may be mounted on or otherwise associated with the spindle 44, such as a wheel end disconnect or components associated with a tire inflation system. Examples of wheel end disconnects are disclosed in United States Patent Publication No. 2019/0331173, the disclosure of which is hereby incorporated by reference in its entirety. Examples of tire inflation system are disclosed in U.S. Pat. Nos. 9,333,813, 9,452,645, and 9,809,065, the disclosures of which are hereby incorporated by reference in their entirety. In a tire inflation system, a pressurized gas source may be fluidly connected to a tire via one or more intervening components, such as a rotary coupling, wheel hub, conduit, or combinations thereof. The pressurized fluid may be liquid or a gas or gas mixture, such as air, nitrogen, or the like.

The pressurized fluid source 180 may be fluidly connected to the first port 80 with a first conduit 182. The first conduit 182 may have any suitable configuration. For instance, the first conduit may include a hose, tube, pipe, or combinations thereof. A fitting 184 may facilitate coupling of the first conduit 182 to the spindle. In such a configuration, the first conduit 182 and the fitting 184 may fluidly couple the pressurized fluid source 180 to the fluid passage 100. The fluid passage 100 may be fluidly connected to another component, such as a wheel end disconnect or components associated with a tire inflation system, by the second port 82. It is also contemplated that lubricant may be provided via the fluid passage 100.

Figure 6:
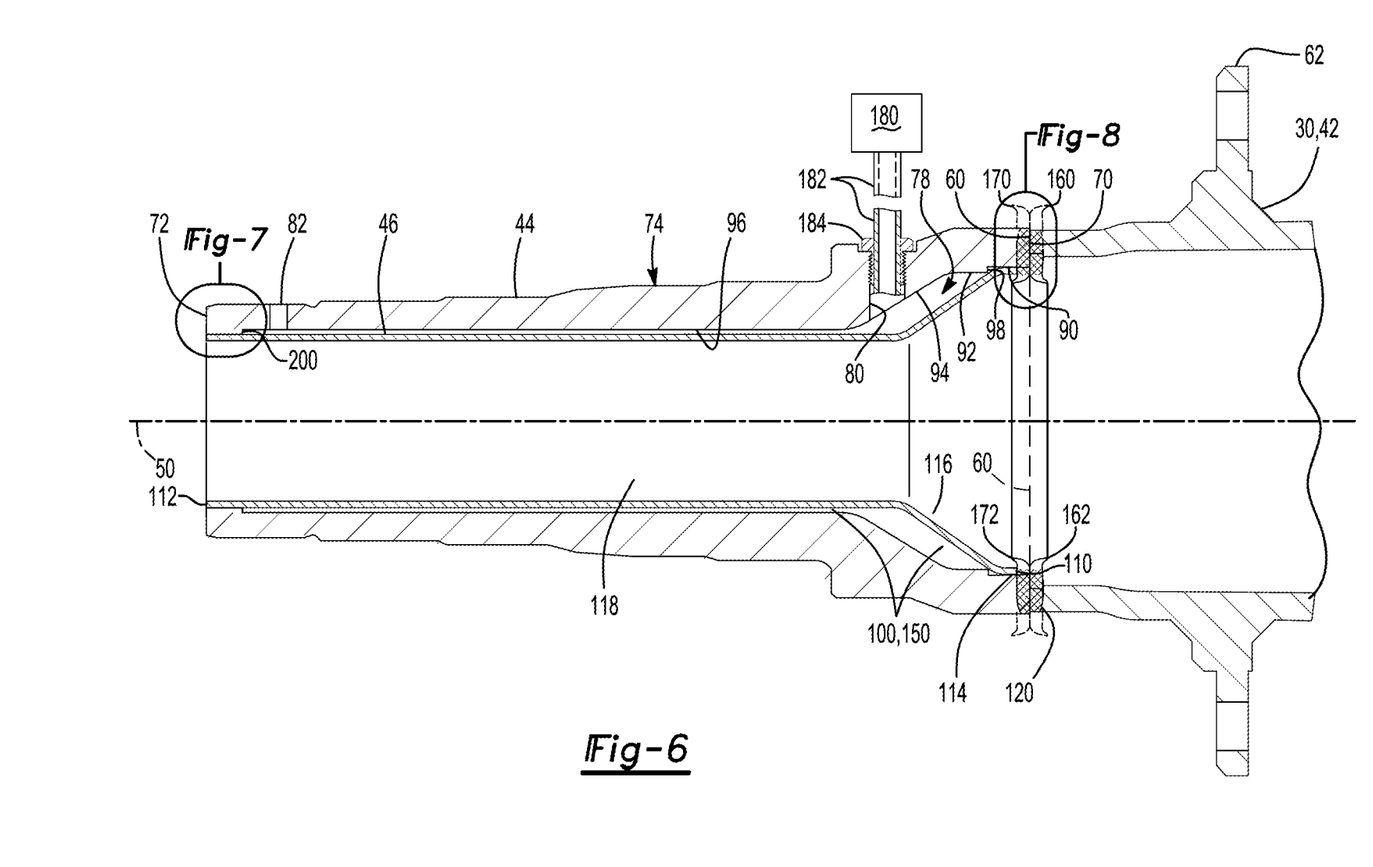
FIG. 6 is a section view of another configuration of a portion of the axle housing with the axle shaft omitted for clarity.
Figure 7:
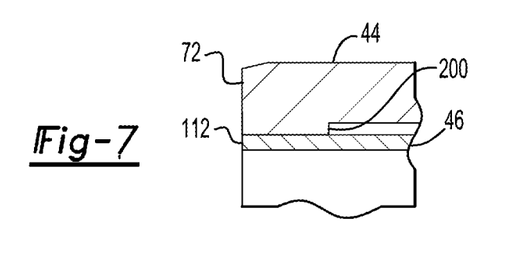
FIGS. 7 and 8 are magnified views of portions of FIG. 6.
Figure 8:
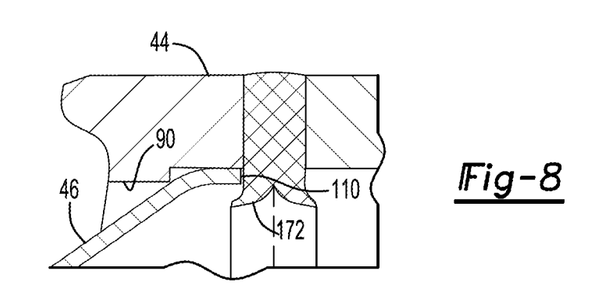

Referring to FIGS. 6-8, another configuration is shown that is similar to the configuration shown in FIG. 4. In this configuration, the sleeve 46 may be press fit into the spindle 44 and the sleeve 46 may not be welded to the spindle 44. The spindle 44 may include a neck 200. The neck 200 may be disposed proximate or may extend from the second end 72 of the spindle 44. In at least one configuration, the neck 200 may be axially positioned between the second end 72 of the spindle and the second port 82. The neck 200 may have a smaller diameter than the fourth inner surface 96 and may engage or contact the sleeve 46. As such, the sleeve 46 may be inserted into the spindle 44 and may be press fit against the spindle 44 at both ends, such as against the neck 200 and the first inner surface 90. It is contemplated that the second internal curl 172 may or may not extend to the sleeve 46 in this configuration. For example, the first sleeve end 110 may be spaced apart from the second internal curl 172 as is best shown in FIG. 8.

Figure 9:
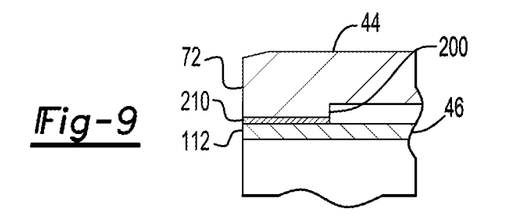
FIGS. 9 and 10 are magnified views of that show examples of a sealant disposed between the spindle and the sleeve.
Figure 10:
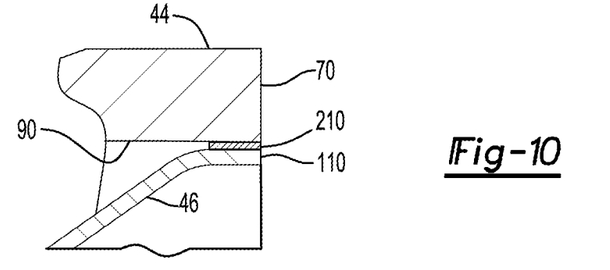

Referring to FIGS. 9 and 10, a configuration is shown that is similar to that shown in FIGS. 7 and 8. In this configuration, a sealant 210 may be provided between the spindle 44 and the sleeve 46. The sealant 210 may be of any suitable type. For instance, the sealant 210 may be an adhesive or sealant such as an anaerobic flange sealant. The sealant 210 may be provided near the first sleeve end 110, the second sleeve end 112, or both, and may extend from the sleeve 46 to the spindle 44 to help inhibit fluid leakage from the fluid passage 100. For instance, the sealant 210 may extend from the neck 200 to an outer surface of the sleeve 46 that may face away from the axis 50 as shown in FIG. 9 and may extend from a surface of the spindle 44 such as the first inner surface 90 to the outer surface of the sleeve 46 proximate the first sleeve end 110. It is also contemplated that the sealant 210 may extend from another surface of the spindle 44 than the first inner surface 90 as shown in FIG. 10. For instance, the sealant 210 may extend from the second inner surface 92, the third inner surface 94, or the fourth inner surface 96 and configurations where the sleeve 46 has a reduced axial length.

In at least one configuration, the sealant 210 may extend continuously around the sleeve 46 such that the sealant 210 may separate the sleeve 46 from the spindle 44. It is also contemplated that the sleeve 46 may contact the spindle 44 at various points or regions and that the sealant 210 may fill voids or gaps that may otherwise be present between the spindle 44 and the sleeve 46. In at least one configuration, the sealant 210 may be applied to the spindle 44, the sleeve 46, or the spindle 44 and the sleeve 46 prior to inserting the sleeve 46 into the spindle 44.

Figure 11:
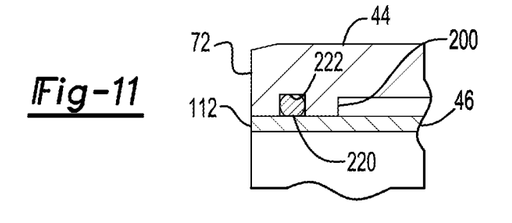
FIGS. 11 and 12 are magnified views of that show examples of a seal disposed between the spindle and the sleeve.
Figure 12:
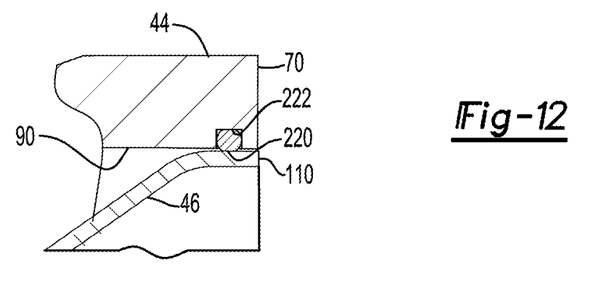

Referring to FIGS. 11 and 12, a configuration is shown that is similar to that shown in FIGS. 9 and 10. In this configuration, a seal 220 may be provided between the spindle 44 and the sleeve 46. The seal 220 may be of any suitable type end may be made of any suitable material. For instance, the seal 220 may be an O-ring having any suitable cross-section. The seal 220 may be provided near the first sleeve end 110, the second sleeve end 112, or both, and may extend from the sleeve 46 to the spindle 44 to help inhibit fluid leakage from the gap 150. For instance, the seal 220 may extend from the neck 200 to the outer surface of the sleeve 46 as shown in FIG. 11 and may extend from a surface of the spindle 44 such as the first inner surface 90 to the outer surface of the sleeve 46 proximate the first sleeve end 110 as shown in FIG. 12. In at least one configuration, the seal 220 may extend continuously around the sleeve 46 such that the seal may separate the sleeve 46 from the spindle 44. It is also contemplated that the sleeve 46 may contact the spindle 44 when a seal 220 is provided and that one or more ends of the sleeve 46 may be press fit into the spindle 44 when a seal 220 is provided.

A groove 222 may be provided to receive and help retain the seal 220. In FIGS. 11 and 12, a groove 222 is provided with the spindle 44; however, it is contemplated that the groove 222 may be provided with the sleeve 46 in other configurations. In FIG. 11, the groove 222 is configured as a recess or indentation in the neck 200 that may extend around the seal 220. In FIG. 12, the groove 222 is configured as a recess or indentation that may be provided in an inner surface of the spindle 44, such as the first inner surface 90. It is also contemplated that the groove 222 may be provided in another inner surface of the spindle 44, such as the second inner surface 92, the third inner surface 94, or the fourth inner surface 96 and configurations where the sleeve 46 has a reduced axial length.

Figures 13, 14:
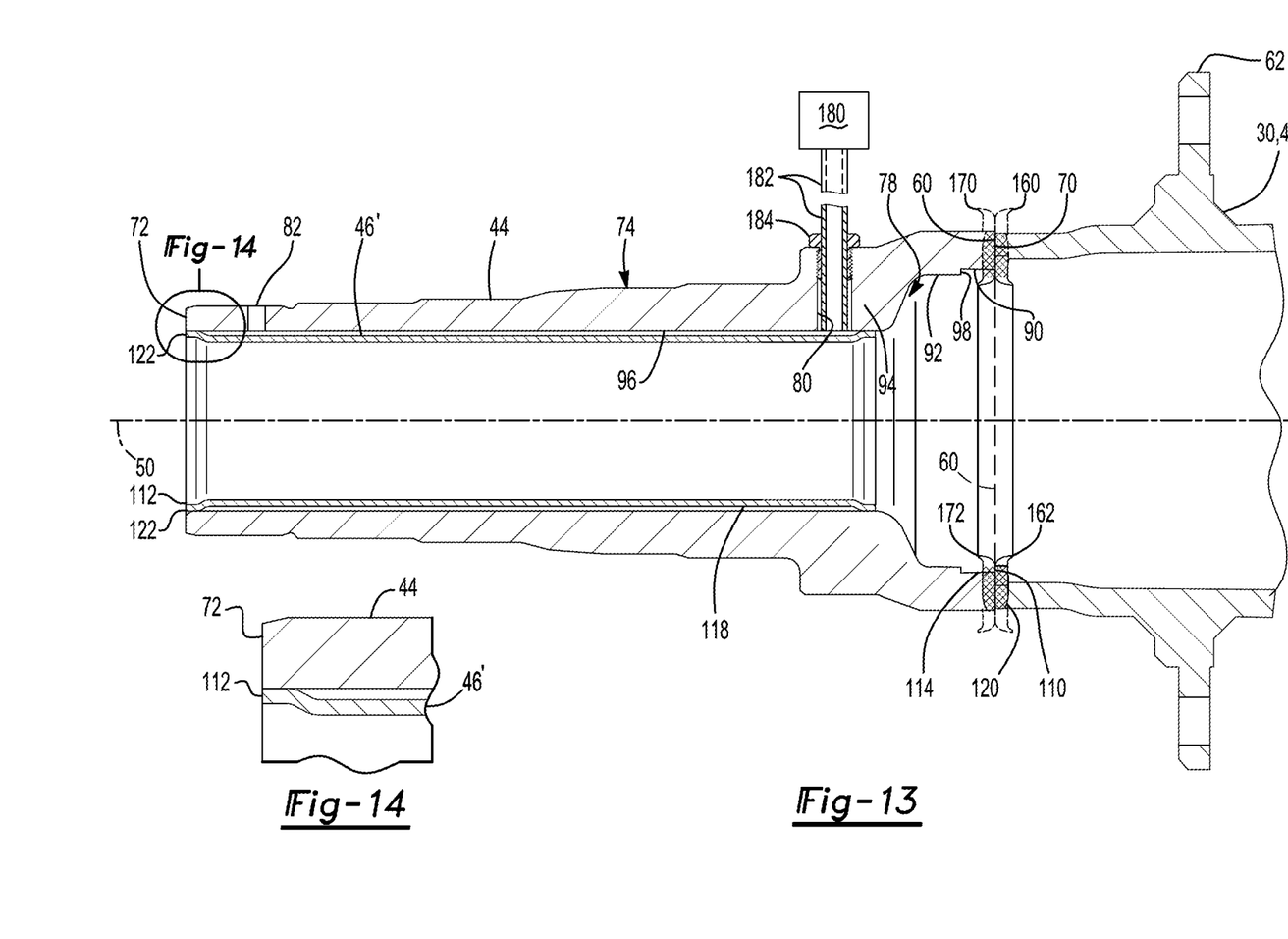
FIG. 13 is a section view of another configuration of a portion of the axle housing with the axle shaft omitted for clarity that has a sleeve having a shorter axial length.
FIG. 14 is a magnified view of a portion of FIG. 13.

Referring to FIG. 13, a configuration is shown that is similar to that shown in FIG. 4. In this configuration, the sleeve 46' has a reduced axial length as compared to the sleeve that is shown in FIG. 4. In such a configuration, the largest outside diameter of the sleeve 46' may be smaller than the largest outside diameter of the sleeve 46 that is shown in FIG. 4. As such, the sleeve 46' may have a smaller outside diameter than the first internal curl 162 and the second internal curl 172, which may allow the sleeve 46' to be inserted or removed after the spindle 44 is attached to the axle housing 30. In addition, the first port 80 of the spindle 44 may be repositioned so that the first port 80 is located between the first sleeve end 110 and the second sleeve end 112. For instance, in FIG. 13 the first port 80 is positioned further from the first end 70 of the spindle 44 than in the configuration shown in FIGS. 4 and 5. In FIG. 13, the first port 80 extends to the fourth inner surface 96 of the spindle 44.

Referring to FIG. 14, a magnified view of the sleeve 46' is shown proximate the second sleeve end 112. The sleeve 46' may have a larger outside diameter at the first sleeve end 110 and the second sleeve end 112 as compared to a region of the sleeve 46' that is disposed between the first sleeve end 110 and the second sleeve end 112. For instance, the sleeve 46' may be initially formed as a cylindrical tube and then the ends of the sleeve 46' may be expanded outward to provide a larger outside diameter at both ends. The expanded ends may then be press fit into the spindle 44 to secure the sleeve 46' and inhibit the leakage of pressurized fluid from the fluid passage 100. The second sleeve end 112 may have a similar configuration as the first sleeve end 110.

Figure 15:
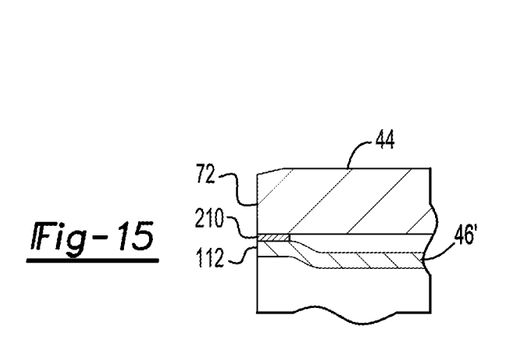
FIGS. 15 and 16 are magnified views that show examples of a sealant disposed between the spindle and the sleeve that may be provided with the configuration shown in FIG. 13.
Figure 16:
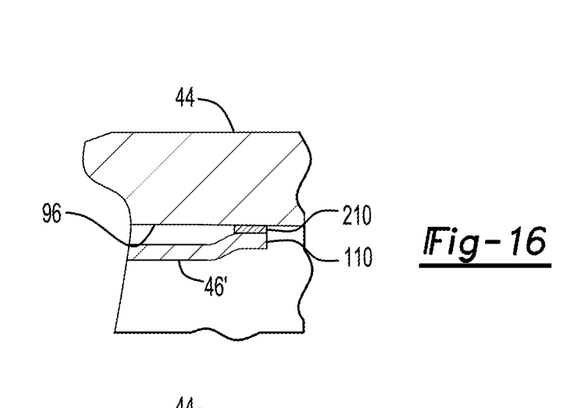

Referring to FIGS. 15 and 16, magnified views are shown in which a sealant 210 is provided between the spindle 44 and the sleeve 46'. FIGS. 15 and 16 are similar to FIGS. 9 and 10, respectively, with the main differences being that a neck is not provided with the spindle 44 in FIG. 15 and the sealant 210 is depicted in contact with the fourth inner surface 96 of the spindle 44 rather than the first inner surface 90 due to the reduced axial length of the sleeve 46'. The sealant 210 may be of any suitable type and may be provided near the first sleeve end 110, the second sleeve end 112, or both, to help inhibit fluid leakage from the fluid passage 100 as previously discussed.

Figure 17:
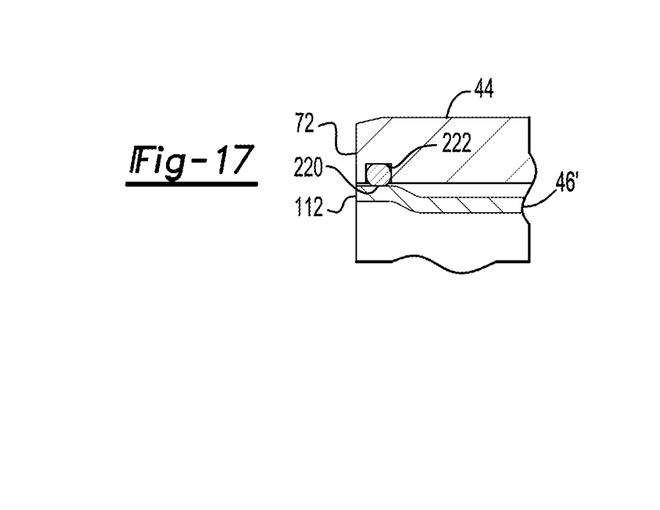
FIGS. 17 and 18 are magnified views that show examples of a seal disposed between the spindle and the sleeve that may be provided with the configuration shown in FIG. 13.
Figure 18:
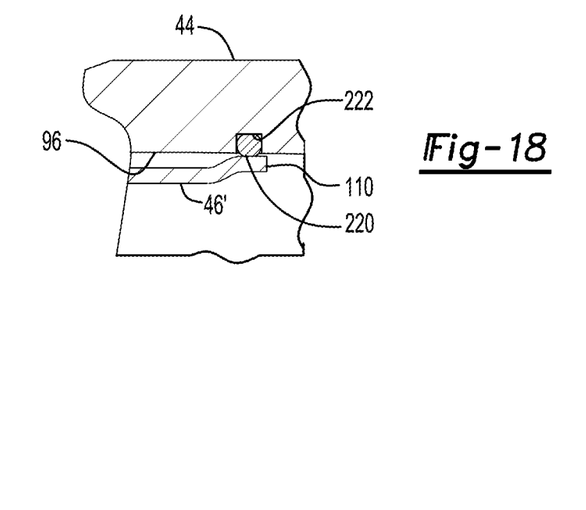

Referring to FIGS. 17 and 18, magnified views are shown in which a seal 220 is provided between the spindle 44 and the sleeve 46'. FIGS. 17 and 18 are similar to FIGS. 11 and 12, respectively, with the main differences being that a neck is not provided with the spindle 44 in FIG. 17 and the seal 220 is depicted in contact with the fourth inner surface 96 of the spindle 44 rather than the first inner surface 90 due to the reduced axial length of the sleeve 46'. The seal 220 may be of any suitable type and may have any suitable configuration as previously discussed.

In the configurations discussed above, it is also contemplated that the spindle 44 may be heated to increase the diameter of the spindle hole 78 to facilitate installation of the sleeve 46, 46' that the sleeve 46, 46' may be cooled to decrease the outside diameter of the sleeve 46, 46', or combinations thereof to achieve an interference fit or press fit. For instance, the spindle 44 may be heated to increase its inside diameter. Next, the sleeve 46, 46' may be inserted into the spindle hole 78 to a desired axial position. Then the spindle 44 may be allowed to cool to decrease its inside diameter to reduce or eliminate the gap between the interior side 76 of the spindle 44 and the sleeve 46. Accordingly, the spindle 44 may then compress against the sleeve 46, 46' or and intervening components such as the sealant 210 or a seal 220. Similar results may be obtained by calling the sleeve 46, 46' prior to insertion into the spindle hole 78 and then allowing the sleeve 46, 46' to warm up and expand toward the spindle 44.

It is also contemplated that the configurations described above may be provided in various combinations. For instance, one end of a sleeve 46, 46' may be press fit against the spindle 44 without a sealant 210 or a seal 220 while an opposing end may be welded to the spindle 44, may be provided with a sealant 210, may be provided with a seal 220, or combinations thereof. As another example, one end of a sleeve 46, 46' may be welded to the spindle 44 while an opposing end may be provided with a sealant 210, may be provided with a seal 220, or combinations thereof. As yet another example, one end of the sleeve 46, 46' may be provided with a sealant 210 while the other and of the sleeve 46 may be provided with a seal 220.

The configurations described above may allow a fluid connection to be made between a spindle and one or more components that may be mounted on a spindle or that may be rotatable with respect to the spindle by providing a fluid passage that is disposed inside the spindle. An internal fluid passage may be more robust or durable than an external conduit and may be better protected from damage and the environment. In addition, the configurations described above may allow a fluid passage to be provided without routing a conduit (e.g., tube, hose) through the spindle, which may be susceptible to damage when other components, such as the axle shaft, are installed in the axle assembly or when components are removed or reinstalled during maintenance operations. The fluid passage may also have a larger volume than a fluid passage that may be provided with a conduit, which may help increase the volume of fluid available to actuate a component like a wheel end disconnect or to inflate a tire.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle housing having an arm portion that is adapted to receive an axle shaft;
   a spindle having a spindle hole that extends along an axis from a first end of the spindle to a second end of the spindle;
   a sleeve that is disposed in the spindle hole and that has a first sleeve end and a second sleeve end;
   a first weld that extends around the axis and joins the first end to the first sleeve end and joins the arm portion to the spindle and the sleeve; and
   a second weld that extends around the axis and joins the second end to the second sleeve end, wherein the sleeve is smaller than the spindle between the first sleeve end and the second sleeve end such that a fluid passage is provided between the spindle and the sleeve.

2. The axle assembly of claim 1 wherein a first port is disposed in the spindle and extends to the fluid passage and a second port extends through the second weld to the fluid passage.

3. The axle assembly of claim 1 wherein a first port and a second port are disposed in the spindle and extend to the fluid passage.

4. The axle assembly of claim 3 wherein the second port extends through the second weld.

5. The axle assembly of claim 1 wherein the spindle extends around the axis and has a first inner surface that extends from the first end and faces toward the axis, a second inner surface that is spaced apart from the first inner surface and faces toward the axis, and a step surface that extends from the first inner surface to the second inner surface, the sleeve has a mounting flange that extends from the first sleeve end, a connecting portion that extends from an end of the mounting flange that is disposed opposite the first sleeve end, and a tubular body that extends from the connecting portion to the second sleeve end, wherein the connecting portion and the tubular body are spaced apart from the spindle, and wherein the mounting flange engages the first inner surface.

6. The axle assembly of claim 1 wherein the sleeve and the spindle have substantially the same axial length.

7. The axle assembly of claim 1 wherein the first weld and the second weld are air impermeable and inhibit leakage of pressurized fluid from the fluid passage.

8. The axle assembly of claim 1 wherein the spindle encircles the second weld.

9. The axle assembly of claim 1 wherein the spindle extends around the axis and has a first inner surface that extends from the first end and faces toward the axis, a second inner surface that is spaced apart from the first inner surface, faces toward the axis, and is disposed closer to the axis than the first inner surface is disposed to the axis, a step surface that extends from the first inner surface to the second inner surface, a third inner surface that extends from an end of the second inner surface, and a first port that extends through the spindle from the third inner surface.

10. The axle assembly of claim 9 wherein the spindle has a fourth inner surface that extends from the third inner surface toward the second end and that is disposed closer to the axis than the second inner surface and the third inner surface.

11. The axle assembly of claim 10 wherein the third inner surface extends progressively closer to the axis as the third inner surface extends from the second inner surface toward the fourth inner surface.

12. The axle assembly of claim 11 wherein the sleeve has a mounting flange that extends from the first sleeve end, a connecting portion that extends from an end of the mounting flange that is disposed opposite the first sleeve end, and a tubular body that extends from the connecting portion to the second sleeve end, the second inner surface and the third inner surface of the spindle encircle the connecting portion, and the spindle is disposed furthest from the sleeve between the third inner surface and the connecting portion.

13. The axle assembly of claim 4 wherein the second port extends substantially parallel to the axis.

14. The axle assembly of claim 5 wherein the fluid passage is larger between the connecting portion and the spindle than between the tubular body and the spindle.

15. The axle assembly of claim 5 wherein the first inner surface and the second inner surface encircle the axis and the second inner surface is disposed closer to the axis than the first inner surface is disposed to the axis.

16. The axle assembly of claim 5 wherein the connecting portion extends progressively closer to the axis as the connecting portion extends from the mounting flange to the tubular body.

17. The axle assembly of claim 5 wherein the mounting flange has a larger diameter than the connecting portion and the tubular body has a smaller diameter than the connecting portion.

18. A method of making an axle assembly comprising:
   providing a spindle having a spindle hole that extends along an axis from a first end of the spindle to a second end of the spindle;
   providing a sleeve having a first sleeve end and a second sleeve end;
   inserting the sleeve into the spindle hole such that there is a gap between the spindle and the sleeve between the first sleeve end and the second sleeve end; and providing a first air impermeable connection between the spindle and the sleeve proximate the first sleeve end by providing a first weld that extends around the axis and joins the first end to the first sleeve end and joins an arm portion of an axle housing that is adapted to receive an axle shaft to the spindle and the sleeve, and providing a second air impermeable connection proximate the second sleeve end, wherein the second air impermeable connection is a second weld that extends around the axis and joins the second end to the second sleeve end, wherein the sleeve is smaller than the spindle between the first sleeve end and the second sleeve end such that a fluid passage is provided between the spindle and the sleeve.

19. The method of claim 18 wherein a first port and a second port are disposed in the spindle and extend to the fluid passage.

20. The method of claim 18 wherein joining the spindle to the sleeve and the axle housing includes friction welding the spindle to the axle housing and wherein friction welding the spindle to the axle housing joins the sleeve to the spindle and generates an internal curl that extends around the axis.

\* \* \* \* \*